United States Patent [19]
Sheetz

[11] Patent Number: 5,461,141
[45] Date of Patent: Oct. 24, 1995

[54] SOLID PHASE POLYMERIZATION OF NYLON

[75] Inventor: Howard A. Sheetz, Lancaster, Pa.

[73] Assignee: DSM N.V., Heerlen, Netherlands

[21] Appl. No.: 144,710

[22] Filed: Oct. 29, 1993

[51] Int. Cl.[6] .................................. C08F 6/16; C08J 3/00
[52] U.S. Cl. .......................... 528/481; 528/503; 528/903
[58] Field of Search ..................................... 528/481, 503, 528/903

[56] References Cited

U.S. PATENT DOCUMENTS

| | | | |
|---|---|---|---|
| 2,172,374 | 9/1939 | Flory | 528/481 |
| 3,821,171 | 6/1974 | Beaton | 528/481 |
| 4,757,131 | 7/1988 | Bongers | 528/481 |

Primary Examiner—James J. Seidleck
Assistant Examiner—Duc Truong
Attorney, Agent, or Firm—Richard O. Church

[57] ABSTRACT

The molecular weight, melt viscosity and melt strength of nylon 4.6 are increased by a solid phase polymerization process conducted under anhydrous conditions at temperatures below the melting point of the nylon. In a preferred embodiment, the nylon used in the process is free of surface air, has a moisture content less than 0.2 wt %, preferably less than 0.02 wt %, and more preferably less than 0.01 wt %. It is also preferred that the extractable impurities are less than 0.2 wt %, preferably less than 0.02 wt %, and more preferably less than 0.01 wt %. The nylon 4.6 product of this anhydrous process is characterized by molecular weights in excess of 50,000, melt viscosities in excess of 600 Pascal-seconds, relative viscosities in excess of 160 and degradation ratios of 7 or less.

23 Claims, 3 Drawing Sheets

SOLID PHASE POLYMERIZATION OF NYLON

BACKGROUND OF THE INVENTION

1. Field of the Invention

This invention relates to a process for the solid phase polymerization of nylons and especially to the solid phase polymerization of the polymer of tetramethylene diamine and adipic acid, more simply referred to as nylon 4.6. Nylons treated in the process of the invention, as compared with prior art processes, combine improved properties of higher molecular weights, higher melt strengths, higher melt viscosities, less degradation and lower degradation ratios. The nylon resins of this invention are well suited for use in melt forming processes such as extruding, casting, blowing, spinning and other processes in which high melt strength and high melt viscosities are needed.

2. Definitions

As used herein the following terms and test procedures are defined as follows:

1. Melting point (MP). The exothermic peak which occurs during heating of small samples in a differential scanning calorimeter (DSC) (ASTM D3417).
2. Glass transition temperature ($T_g$). The damping peak which occurs between the hard glassy phase and the rubbery phase during heating of material on a dynamic mechanical analyzer (DMA) (ASTM 4065).
3. Relative viscosity (RV). The relative viscosity compares the viscosity of a solution of polymer in formic acid with the viscosity of the formic acid itself (ASTM D-789). The test results reported in this specification were obtained using 10.98 grams of nylon 4.6 dissolved in 100 cc. of formic acid at 25° C.
4. Melt viscosity (MV). An indicator of the melt flow characteristic of a resin as measured in Pascal seconds (Pa.sec) with a Monsanto capillary melt rheometer measured at 316° C. under constant pressure conditions.
5. Degradation ratio (DR). A measure of the degree of degradation of the melt viscosity of a resin upon heating to above the melting point of the resin calculated by dividing the determined melt viscosity after 5 minutes dwell time by the melt viscosity after 17 minutes dwell time.
6. Heat deflection temperature (HDT). The temperature at which a rectangular bar of regular cross section deflects 0.025 cm. under a load of 1820 kPa (264 psi) as specified in ASTM D 648-82.
7. Particulate. An adjective used to describe resins in the form of discrete particles. Particulate resins are sometimes made by chopping small diameter (e.g. 0.5 cm) extruded rods into approximately 0.3 to 0.8 cm. lengths and are also made by compacting powders into small pellets, usually <1 cm. in diameter. The exact size and shape of particulate resins (also sometimes referred to as pellets or molding resins) useful in this invention are not of great importance other than that, for convenience in handling, they should be larger than fine powders and for efficient and reasonable treatment times they should be smaller than about 2 cm., and preferably smaller than about 0.5 cm., in diameter. It should also be mentioned that reference to nylon 4.6 resins, whether in particulate form or otherwise, refers to resins having molecular weights above about 15,000, which are useful, at least, in injection molding processes.
8. Reactive and non-reactive gases. "Reactive gas" is used to mean a gas that will react with nylon 4.6, as by oxidation, at the temperatures and conditions to which the nylon is exposed in the processes of the invention and "non-reactive gas" is used to mean gases that will not react with the nylon under these conditions.
9. Extractable impurities. This term is used to mean polymerization residues, such as monomers and oligomers, which can be removed by extraction in water or cyclohexane or by devolatilization at temperatures below the melting point of the nylon. In the case of nylon 4.6, extractable impurities begin to volatilize at useful rates at a temperature of about 175° C.
10. Molecular weight. Unless otherwise indicated, all molecular weights are given as number average molecular weights.

3. Discussion of the Prior Art

Nylons are filling a growing need for polymeric materials that maintain strength and solvent resistance in elevated temperature environments, i.e. at temperatures which may sometimes approach 300° C. Devices mounted in the engine compartments of cars and trucks are examples of this need in which the quest is never ending for lighter and stronger materials having good strength and chemical resistance. Films, monofilaments and fibers with good high temperature properties are also being sought.

Among the nylons, nylon 4.6 (nylons are identified in the specification and claims using "." [a period] to separate the number designation of amine and acid groups and "/" [a slash] to separate copolymer components) is particularly suitable for these purposes because of its high melting point (MP), high glass transition temperature ($T_g$), and high heat deflection temperature (HDT), all of which thermally related properties exceed those of other commercially available aliphatic nylons. In the molecular weights in which it is polymerized and made available, however, nylon 4.6 is difficult to process in melt processes such as extrusion, film casting, film blowing, blow molding and fiber spinning since these processes require resins with high melt viscosities, high melt strengths and good melt stability (low degradation ratio). The melt properties of resins used in these processes are unlike those needed or desired in injection molding since high melt viscosities decrease flow and increase cycle times. Melt stability is usually of lesser concern in injection molding because of the characteristic short cycle times.

It is well recognized that all thermoplastic polymers show a change in properties with changing molecular weight. Linear nylons exhibit increasing ductility, toughness, melt viscosity and melt strength with increasing molecular weight. Since these properties are especially beneficial in extrusion, film forming, fiber spinning and blow molding processes, it follows that methods by which higher molecular-weight nylon resins can be obtained are of utility and commercial importance.

The required melt viscosity of resins used in melt forming processes varies considerably in practice depending upon the size and shape of the article formed, the forming process, and the residence time of the melted resin in the processing equipment. Since melt viscosities are usually unstable and degrade above the melting point of the resin, the residence time in the melt must be taken into account in determining the required properties of the resin; that is, the properties of the resins entering a melt forming process must be high enough to accommodate the thermal degradation imposed by the process.

It has been observed that nylon 4.6 molding resins are generally more sensitive to thermal degradation than are other of the common types of nylon particularly due to the high processing temperatures required. To quantify the expected thermal degradation (e.g., loss in melt viscosity) of resins when detained above their melting points, an arbitrary test has been devised which provides a numerical value called the "degradation ratio" as defined above. A degradation ratio near unity suggests a melt stable resin and higher ratios suggest resins with increasing susceptibility to degradation while in the melt.

Common criteria for the melt forming of nylons by extrusion, blowing, casting and spinning include melt viscosities in a range of from about 600 to 1,000 or more Pascal.seconds, relative viscosities in a range of about 140 to 200 or more, and degradation ratios of about 7 or less. The highest melt and relative viscosities are needed in the extrusion of articles having diameters or thicknesses exceeding about 2.5 cm (sometimes referred to as heavy section extrusion) because of the especially long times the resins are held above the melt. At the lower end of the scale, that is at melt viscosities of about 600 Pascal.seconds and relative viscosities of about 140, cast film can be extruded. The requirements of other extruding, blowing, and fiber spinning processes usually lie somewhere in between these values.

Numerous processes for increasing the molecular weight of nylons have been proposed in the prior art. These processes may be divided into those that are conducted above the melting point of the polymer and those that are conducted below the melting point of the polymer. It is the latter type of process with which this invention is concerned and is referred to as "solid phase" or sometimes "solid state" polymerization.

Solid phase polymerization via chain extension of a previously polymerized nylon is particularly useful when there is a need to increase the melt viscosity and melt strength of nylon molding resins. One reason this is true is that the equilibrium between nylon monomer and polymer favors polymer formation at lower temperatures. The lower temperatures used in solid phase polymerization processes are also of benefit since undesirable side reactions are less apt to occur and degradation is minimized.

The susceptibility of nylons to solid phase polymerization was recognized early in the development of nylon as is disclosed in U.S. Pat. No. 2,172,374. Here it is taught that the degree of polymerization can be increased by heating a polymer of a diamine-dibasic acid type at a temperature below its melting point but high enough to effect polymerization. However, attempts which have been made to increase the molecular weight of nylon 4.6 resins by using the teachings of U.S. Pat. No. 2,172,374 have not proved successful, possibly because the experimental results reported in the patent were obtained using "half-made", non-fiber-forming nylons.

The prior art has also recognized that superheated steam can be used to increase the molecular weight and melt viscosity of nylon. U.S. Pat. No. 3,420,804, after noting that there exists an intimate relationship between molecular weight and relative viscosity of nylons, teaches the treatment of nylons at temperatures below their melting points in an atmosphere of superheated steam. It is disclosed that the relative viscosity of nylons having initial values of between 20 to 50 can be increased in viscosity by a value of at least 10, i.e. to relative viscosities of from 30 to 60. The relative viscosities given in the patent are defined as the ratio of the viscosity of a solution of 10.98 grams of nylon in 100 cc. of ninety percent by weight formic acid at 25° C. to the viscosity of the formic acid at the same temperature.

It has been reported that useful solid phase polymerization of nylon 4.6 can be achieved at elevated temperatures below its melting (circa 295° C.) in a nitrogen atmosphere in which steam (water) is present. It was observed that if the process is conducted under anhydrous conditions, by-products and products of degradation are formed which cause an observable change in color and detract from the physical properties of the nylon 4.6.

Other examples of the solid state polymerization of nylon 4.6 in the presence of water (steam) can be found, for example, in U.S. Pat. Nos. 4,460,762 and 4,757,131. Each of these patents describe an in-line two step process in which a prepolymer of nylon 4.6 is polymerized in the melt to a relative low molecular weight, i.e. below about Mn 10,000, and then the polymerization is continued in an steam bearing nitrogen atmosphere at temperatures of above about 200° C. to yield a polymer having a number average molecular weight of 15,000 and over. These patents use the phraseology "after condensation" which, in the context in which it is there used, has the same meaning as the phrase "solid phase polymerization" used in the present specification.

All the useful prior art processes which are known for the solid phase polymerization of nylon 4.6 require the presence of some water which it has been believed is necessary for reactions to proceed between the end groups of nylon chains, at least at meaningful rates and without excessive degradation as evidenced by an observable yellowing of the nylon.

The prior art processes for the solid phase polymerization of nylon 4.6 in the presence of superheated steam, as compared with the processes of the here disclosed invention, suffer from the disadvantage that relatively high temperatures are required to obtain the desired high melt viscosities at useful rates. For example, it is reported in Example III of U.S. Pat. No. 4,757,131 that a solid phase polymerization was conducted at 255° C. in a flowing stream of nitrogen containing 25 wt % water vapor. The relative viscosity, as determined in a solution containing 1 gram in 100 ml of 96 wt % sulfuric acid, is given as 3.7 after a 19 hour period—which suggests that a number average molecular weight of approximately 25,000 was achieved.

Reference is also made to an article entitled "Preparation and Properties of High Mass Nylon-4,6: A New Development in Nylon Polymers" which appeared in *PLASTICS*, 1985, Vol 26, September co-authored by a co-inventor of the above cited U.S. Pat. No. 4,757,131. It is here reported (vide FIG. 4, page 1585) that a solid phase polymerization of a typical nylon 4.6 prepolymer conducted at 260° C. for a period of 35 hours in a flowing stream of nitrogen containing 25 wt % water yielded a polymer with a relative viscosity (1 g/100 ml in 96% sulfuric acid at 20° C.) of about 8—which equates to a number average molecular weight of about 50,000.

By way of distinction from the U.S. Pat. No. 4,757,131 and the article in *PLASTICS,* the examples that follow will demonstrate that in the practice of the instant invention, number average molecular weights of over 70,000 are attained in about 36 hours at 200° C. whereas the patent reports attained molecular weights of about 25,000 (estimated from the 3.9 relative viscosity in sulfuric acid) in 19 hours at 255° C. and the article reports attained molecular weights of about 50,000 (estimated from the 8 relative viscosity in sulfuric acid) at 260° C. Considering the generally accepted approximation that the rate of a chemical reaction doubles with each incremental increase of 10° C. in temperature, it can be appreciated that the results achieved in the practice of present invention are unexpected and represent a substantial advance in the art.

The prior art processes for the solid phase polymerization nylon 4.6 are also often unsatisfactory because of the unacceptable degradation ratios of the treated resins. This is reported, for example, in U.S. Pat. No. 5,064,700 at column 1, lines 35, et seq., wherein the prior art processes for the solid state polymerization of nylon 4.6 in nitrogen and water vapor are discussed. The patentees write that the molecular weight of resins treated in these processes decrease substantially during melt processing ". . . whereby it is difficult to form a melt having a satisfactory melt viscosity."

SUMMARY OF THE INVENTION

It is, therefore, a principle object of this invention to provide nylon resins, particularly nylon 4.6 resins, that have improved utility in extrusion, blow molding, fiber spinning, monofilament extrusion, film blowing and film casting processes.

Another object of this invention is to provide nylon 4.6 resins that have good melt strength and are well adapted for use in extruding, spinning and blowing processes.

Another object of this invention is to provide a method for increasing the molecular weight, relative viscosity, melt viscosity and melt strength of nylon 4.6 resins.

Yet another object of this invention is to provide a method for increasing the molecular weight of nylon 4.6 resins without observable degradation of the resins.

Yet another object of this invention is to provide a method for preparing high molecular weight nylon 4.6 resins that have acceptably low degradation ratios.

And yet a further object of this invention is to provide a process for preparing high molecular weight nylon 4.6 by solid phase polymerization processes which proceed at comparable rates, at significantly lower temperatures and produce higher molecular weights than do the technical processes of the prior art.

These and other objects of this invention are achieved by conducting a solid phase polymerization of particulate nylon 4.6 resins characterized in that the polymerization is conducted under anhydrous conditions. The polymerization, being in the solid phase, is conducted at temperatures below the melting point of the nylon 4.6, preferably at least 60 ° C. below the melting point of the nylon 4.6, more preferably in a range of from about 195° C. to about 235° C. and, even more preferably, in a range of from 200° C. to about 220° C.

In a preferred embodiment of the invention, the particulate nylon resins used are substantially free from surface air.

It is also preferred that the moisture content of the resins be less than 0.2 wt %, preferably less 0.02 wt % and even more preferably less than 0.01 wt %. It is also preferred that the extractable impurities of the nylon resins be less than 0.2 wt %, preferably less than 0.02%, and even more preferably less than 0.01 wt %. It has been found that if air, moisture or extractable impurities variously are present in greater amounts, the nylon 4.6 resins that are treated in solid phase polymerization processes may suffer inter alia, from degradation, as indicated by an observable color change, high degradation ratios and a loss in ductility and toughness. The degree of purity required, that is the absence of air, moisture or extractable impurities in the nylon used in the invention, will vary from instance to instance depending upon the processing conditions and the property demands of the products that are intended to be made from the nylons treated in the solid phase polymerization of this invention. By way of example, even trace amounts of extractable impurities, i.e. greater than 0.01 wt % can result in visually identifiable defects in films made from the solid phase polymerization nylons of the invention. On the other hand, substantially higher levels of impurities can be tolerated in the case of extruded rods having diameters of one or more centimeters.

In a first treatment step, the nylon 4.6 resin is heated at a temperature of between about 105° C. and about 150° C. in an inert gas stream, for instance dry nitrogen, or under reduced pressure until the surface air is removed and the desired water content is obtained.

If the first treatment step is conducted at temperature above about 150° C., the solid phase polymerization will result in a product with insufficient stability and/or a discoloration of the high molecular weight nylon 4.6

Preferably the temperature is between about 105° C. and about 135° C. The lower temperature is not critical except for the practical consideration of avoiding extended process times.

Extractable impurities in the nylon resins participate in undesirable side reactions at the solid phase polymerization temperatures of this invention. Since extractable impurities in nylon 4.6 only begin to volatilize at temperatures of about 175° C., they can not be removed by devolatilization under the same process conditions as are required for the removal of moisture and surface air. Further, since the extractable impurities begin to participate in unwanted side reactions with nylon 4.6 at temperatures of about 195° C. to 200° C., the resins must be devolatilized, if required, in a separate process step conducted in a temperature range of from about 175° C. to <200° C. Alternatively, extractable impurities can be removed by solvent extraction processes with, for instance, water or cyclohexane.

Process times can be minimized and the efficiencies optimized if the pretreatment processes of removing surface air, moisture and extractable impurities are conducted under vacuum. Good results can also be obtained at somewhat longer treatment times when the resins are processed in a purging stream of a heated, dry, non-reactive gas such as nitrogen.

Typically, nylon 4.6 resins can be both degassed and dried under vacuum to desired levels at temperatures of from 110° C. to 135° C. in from about 15 to 30 minutes but may require several hours to achieve comparable results in a purging stream of dry nitrogen. Similarly, extractable impurities can be reduced to 0.01 wt % at temperatures of from about 175° C. to <200° C., in from about 30 minutes to about 2 hours in a vacuum whereas one to four hours may be needed if the treatment is conducted in a purging stream of dry, non-reactive gas. In any event, in whatever manner the degassing, drying or devolatilization pretreatment processes are conducted, provision must be made to remove gases continuously that emanate from the surface of the resin and maintain a low partial pressure of air, moisture and volatilized extractable impurities within the treatment chamber.

EXAMPLES

TEST APPARATUS

Figure 1:
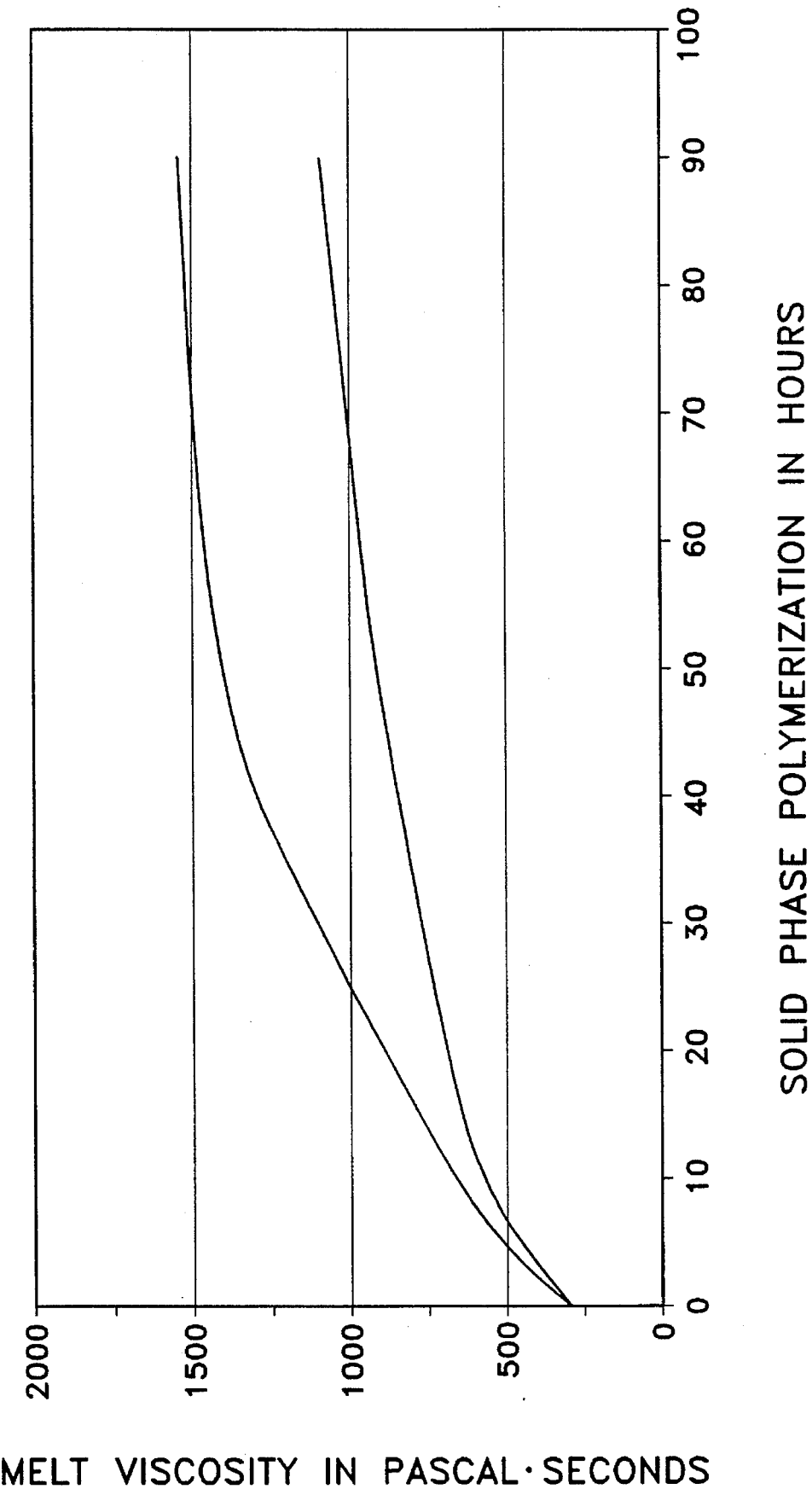
FIG. 1 is a graph in which the change in melt viscosity of nylon 4.6 resins is plotted against the time in hours for a solid phase polymerization conducted at 205° C. under anhydrous conditions. The lower curve is plotted for a resin in which the end group unbalance (AEC-CEG) is 20 microequivalents per gram and the upper curve is plotted for a resin in which the end group unbalance (AEC-CEG) is 15 micro-equivalents per gram.

The apparatus used in processing the resins in following examples was an Abbe blender configured in the shape of two coaxially aligned cones sharing a common base. This permits agitating and mixing the contents of the blender by rotating the blender about an axis perpendicular to the elongated axes of the cones. The Abbe blender was fitted with an external jacket for the circulation of a heat exchange fluid for temperature control. The blender was a closed vessel which could be sealed from the atmosphere to evacuate gases and establish a vacuum or, in the alternative, to circulate heated non-reactive gases through the blender and purge vapors and gases emanating from the surfaces of particulate resins.

EXAMPLE I

A quantity of nylon 4.6 compacted powder pellets (manufactured by DSM and sold under its trade designation STANYL®) was prepared as a molding resin by melt extruding the pellets into rods 0.2 cm in diameter and chopping the rods into approximately 0.3 to 0.8 cm lengths. The particulate nylon 4.6 was characterized as follows:

| | |
|---|---|
| Relative viscosity | 80 |
| Melt viscosity | 274 Pascal-seconds |
| Degradation ratio | 3 |
| Moisture content | 0.05 wt % |
| Extractable impurities | 0.10 wt % |
| End group unbalance (AEG-CEG) | 20 micro-equivalents/gram |
| Blocked end groups | none |

The particulate nylon was placed in an Abbe blender and oil heated to 232° C. was circulated through the jacket. A purging flow of heated, dry nitrogen was circulated through the interior of the blender and an internal temperature and resin temperature of 205° C. was established. The treatment was continued for 46 hours and, after cooling, the resin was discharged from the blender.

Table I summarizes the values that were obtained on samples removed from the treatment vessel at the times indicated during the solid phase polymerization.

TABLE I

| TIME (Hrs.) | RV | MV (Pa · s) | DR |
|---|---|---|---|
| 0 | 79 | 274 | 3.1 |
| 6 | 108 | 525 | 13.3 |
| 14 | 139 | 585 | 14.4 |
| 22 | 164 | 558 | 14.9 |
| 30 | 185 | 863 | 14.4 |
| 38 | 204 | 930 | 15.3 |
| 46 | 219 | 1,020 | 13.0 |

The unbalanced end groups (AEG-CEG) were also determined and it was established that they remained substantially unchanged at a value of 20 micro-equivalents throughout the anhydrous solid phase polymerization. The fact that the end group balance did not change is thought to be of particular significance. This is in contrast to the prior art solid phase polymerizations in the presence of superheated steam in which, as reported in the article in PLASTICS, supra, page 9, pyrrolidine end groups increase with a corresponding decrease in the unbalance between amine and carboxyl end groups (AEG-CEG) as the solid phase polymerization progresses. The article reports that during the solid phase polymerization, the sum of the pyrrolidine end groups and the unbalance in amine and carboxyl end groups [i.e. (AEG-CEG)+PEG] remains constant. Since no change in the unbalance of the amine and carboxyl end groups is observed during the anhydrous solid phase polymerization of this invention, it may be concluded that pyrrolidine end groups are not formed and do not enter into the solid phase reactions.

During the treatment, the samples changed color from off white to a yellowish straw color and the color was observed to deepen with increasing treatment time.

This Example establishes that in the practice of this invention, significantly greater increases in relative viscosity and melt viscosity can be obtained at lower temperatures than is taught by the prior art processes of solid phase polymerization in the presence of superheated steam and without the formation of pyrrolidine end groups.

The resins treated in Example I are, however, limited in their utility because of the high degradation ratio of 13 which resulted. The tabulated data show that the degradation ratio rose almost immediately to significantly higher values, indicating that the process yielded resins of poor thermal stability which could be expected to degrade during a normal residence time above the melting temperature, as in extruding, casting, blowing and spinning processes. Accordingly, the resins prepared in this Example were judged to be of poor quality for use in these melt forming processes.

EXAMPLE II

The procedure of Example I was repeated using the same nylon 4.6 resins except that prior to conducting the solid phase polymerization, the particulate nylon 4.6 was treated in two pretreatment steps in which surface air and moisture were removed in the first pretreatment step and the extractable impurities were removed in the second pretreatment step.

In the first pretreatment step, the pressure was reduced to below atmospheric to approximately 7 kPa (absolute) and a temperature of 120° C. was established within the Abbe blender. The particulate nylon 4.6 was maintained under these conditions for about 4 hours to insure substantially complete removal of surface air and a reduction in moisture to about 0.03 wt %. As discussed above, it is important that this first pretreatment step be conducted at comparatively low temperatures.

At the end of the first pretreatment step, the second pretreatment step to reduce the extractable impurities was begun. To this end, the temperature of the circulating heat exchange fluid was increased to 225° C. and the internal temperature of the blender and the particulate resins was increased to a temperature of 195° C. The pressure was maintained at 7 kPa (absolute) and the treatment was continued for about an hour, after which time the extractable impurities in the nylon 4.6 resin had been reduced to about 0.01 wt % to complete the second pretreatment step.

Having removed surface air, reduced the moisture content to less than 0.05 wt % and reduced the extractable impurities to about 0.01%, a solid phase polymerization process as described in Example I was initiated. Samples of the particulate resin were taken from the blender at the times indicated in the below table II and the properties were measured to be as follows:

TABLE II

| TIME | RV  | MV  | DR  |
|------|-----|-----|-----|
| 0    | 79  | 274 | 3.1 |
| 8    | 115 | 510 | 6.5 |
| 16   | 146 | 634 | 5.6 |
| 24   | 169 | 669 | 6.4 |
| 32   | 187 | 754 | 5.8 |
| 40   | 200 | 809 | 6.0 |

When the samples of this EXAMPLE II were evaluated, no yellowing or other discoloration was observed and, as was the case in Example I, no change occurred in the balance of the amine and carboxyl end groups.

A significant increase in relative viscosity and melt viscosity was achieved in only eight hours of treatment and these values continued to rise quite with increasing times. This increase in the relative and melt viscosities, coupled with the fact that the degradation constant did not exceed the desired value of seven, indicates that the materials treated in accordance with this anhydrous solid phase polymerization is well suited for use in extrusion, casting, spinning or blowing processes. It is noteworthy that the treatment of nylon 4.6 in this process yielded a resin viscosity that was satisfactory for film blowing within only 16 hours.

From the foregoing it has been demonstrated that in the practice of the process of this invention, a solid phase polymerization of nylon 4.6 molding resins can be conducted at significantly lower temperatures than taught by the prior art. The increase in the molecular weight, with concomitant increases in relative viscosity, melt viscosity and melt strength, is greater than that obtained by the higher temperature processes; the increase is obtained in comparable treatment times; the increase is achieved without observable degradation of the resins; and the increase is obtained without an unacceptable rise in the degradation ratio. For these reasons, resins treated in the process of this invention are not only suitable to use in melt forming processes but will yield melt formed products with superior properties.

In this Example II, a two step pretreatment was performed, to remove surface air and to reduce the moisture and extractable impurities from the nylon resins. It can be expected that this pretreatment will usually be required. If, however, nylon resins are available that have the desired low levels of moisture and extractable impurities, pretreatment may not be needed other than to remove surface air from the particulate nylon.

In both of the Examples, the solid phase polymerizations were conducted in a purging stream of dry nitrogen. The solid phase polymerization can also be conducted, and perhaps more efficiently so, under vacuum. In either instance, any gasses emanating from the nylon are removed from the surface of the nylon during the solid phase polymerization.

DETAILED DESCRIPTION OF THE DRAWINGS

FIG. 1 is a graph in which the change melt viscosity of nylon 4.6 resins is plotted against the polymerization time in hours for a solid phase polymerization conducted at 205° C. under anhydrous conditions. The lower curve is plotted for a resin in which the end group unbalance (AEC-CEG) is 20 microequivalents per gram and is based upon the values reported in Table II above. The upper curve is plotted for a resin in which the end group unbalance (AEC-CEG) is 15 micro-equivalents per gram. The values plotted on the curves are observed values in the range of from 0 to 40 hours and are extrapolated values from 48 hours to 95 hours. The curves of FIG. 1 illustrate that the theoretical increase in melt viscosity that is attainable increases as the end group unbalance (AEG-CEG) decreases. This implies, then, that if the end group unbalance of is 20, the highest attainable melt viscosity will approach 1200 Pascal.seconds and that if the end group unbalance is 15, the highest attainable melt viscosity will approach 1600 Pascal.seconds. These highest attainable values are approached in a relatively short polymerization time in the process of the instant invention.

Figure 2:
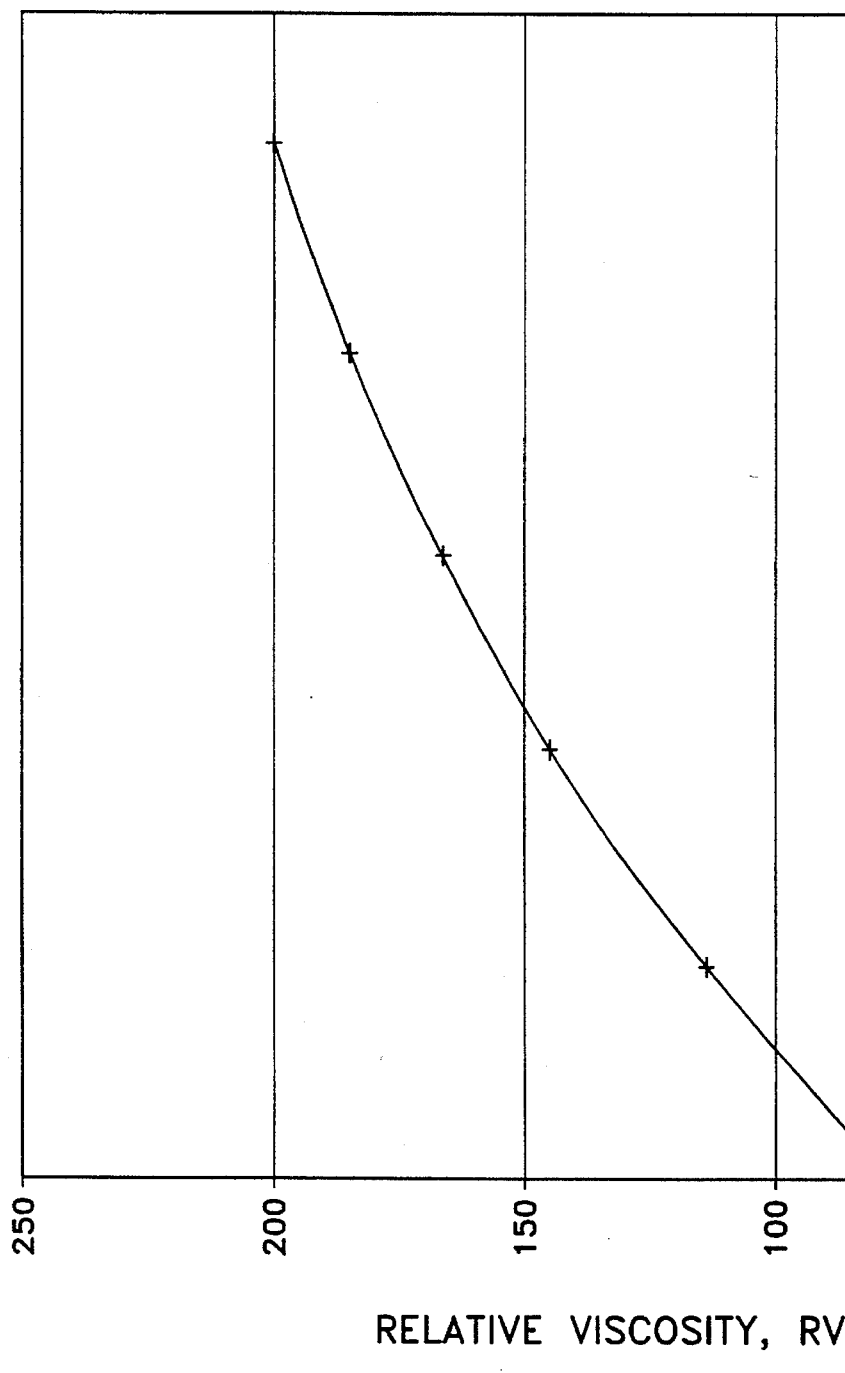
FIG. 2 is a graph in which the change in relative viscosity of nylon 4.6 is plotted against the time in hours for a solid state polymerization conducted at 205° C. under anhydrous conditions.

FIG. 2 is a graph in which the change in relative viscosity of nylon 4.6 is plotted against the time in hours for a solid state polymerization conducted at 205° C. under anhydrous conditions. FIG. 2 was derived from results obtained using the procedures of Example II. It is thus established that the low temperature anhydrous solid phase polymerization processes will yield high values of melt viscosity and relative viscosity even if the nylon 4.6 resins have higher values of moisture and extractable impurities than is desired and the surface air has not been removed. The primary purpose, then, of the pretreatment steps is not to improve the degree of polymerization, but rather it is to prevent degradation of the nylon during solid phase polymerization to yield a melt processable resin with an acceptably low degradation ratio and that is reasonably melt stable.

Figure 3:
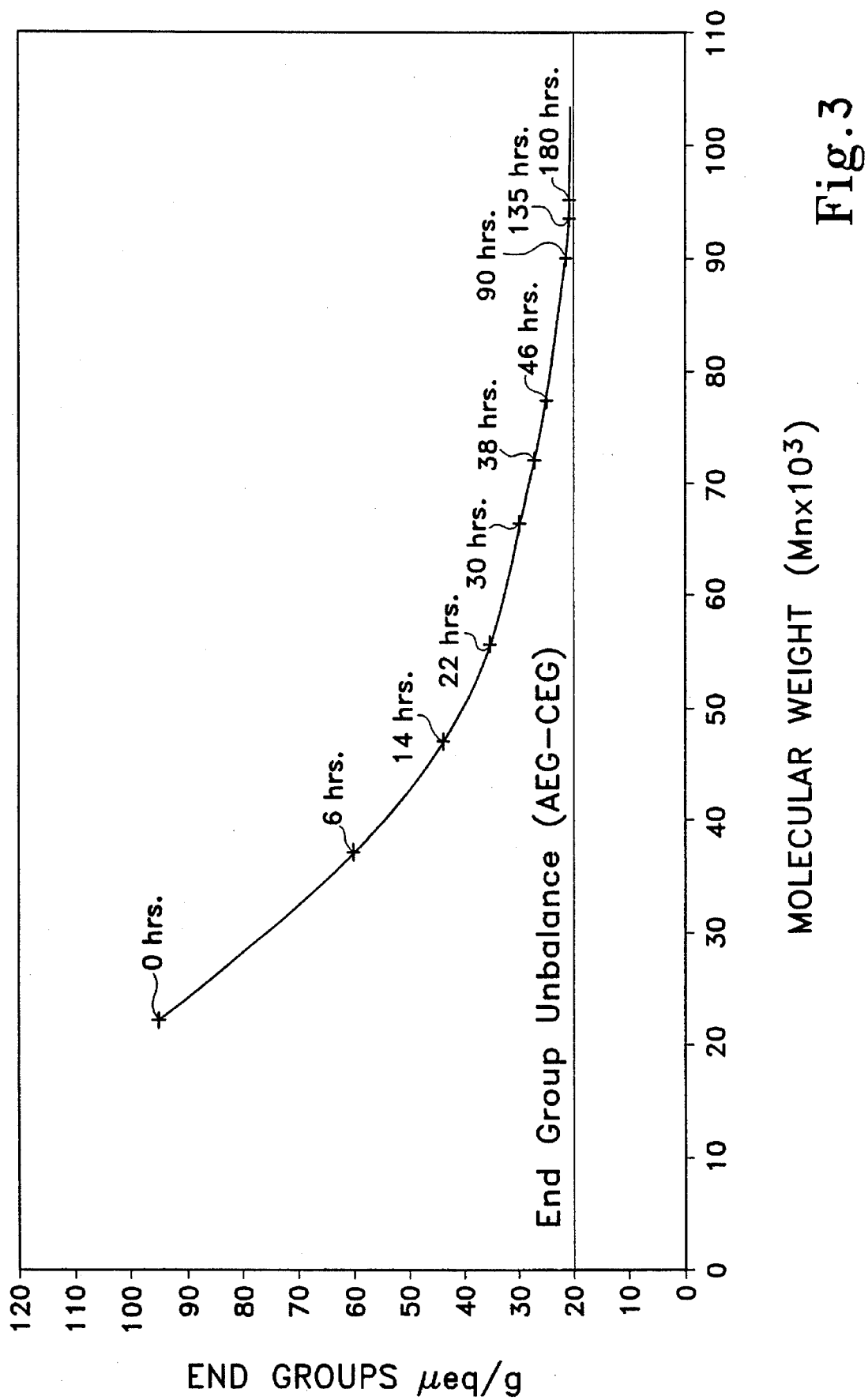
FIG. 3 is a graph in which the change in end groups of a nylon 4.6 resin is plotted against the change in molecular weight (average number weight in thousands) during the progression (time in hours) of a solid phase polymerization conducted at 205° C. under anhydrous conditions.

FIG. 3 is a graph in which the change in end groups of a nylon 4.6 resin (micro-equivalents per gram) is plotted against the change in molecular weight (average number weight in thousands) during the progression (time in hours) of a solid phase polymerization conducted at 205° C. under anhydrous conditions. The plotted values from 0 to 46 hours are as measured and the plotted values from 46 hours to 180 hours and beyond were determined by exponential modeling.

FIG. 3 also includes as a curve in which the change in end group unbalance (AEG-CEG) is plotted as a function of molecular weight. The resin used to obtain the values shown had no blocked end groups and had an end group balance (absolute value) of 20 micro-equivalents per gram, the later of which did not change during an anhydrous solid phase polymerization. As discussed above, the absence of any change in end group unbalance supports the conclusions that the amine and carboxyl end groups do not participate in any side reactions (i.e. reactions other than condensation reactions) and that the formation of pyrrolidine end groups is avoided in the anhydrous solid phase polymerizations of this invention.

It is also noteworthy that the limiting factor of the molecular weight that can be obtained is a function of the reactive end groups and their end groups balance which, in the given case is a molecular weight approaching 100,000. It should be understood that if there are no blocked end groups, the limiting value for the molecular weight of the nylon would approach a horizontal line representing the sum of the absolute value of AEG-CEG and the blocked end groups expressed in microequivalents per gram. Even higher molecular weights seem possible utilizing resins with better balanced end groups.

I claim:

1. A method for increasing the number average molecular weight of nylon 4.6 resins having a number average molecular weight above about 15,000 by solid phase polymerization, comprising the steps of:
   a. first, removing moisture and surface air from the resins at a temperature below about 150° C.;
   b. second, removing extractable impurities from the resins in excess of about 0.2 wt % of the resins;
   c. third, heating the resins to solid phase polymerization temperatures in a range of between about 195° and about 235°; and
   c. maintaining the polymerization temperatures to effect solid phase polymerization while continuously removing gases emanating from the surface of the resins.

2. A method according to claim 1 wherein the moisture content of the resin after moisture removal is less than 0.02%.

3. A method according to claim 1 wherein extractable impurities of the resin are removed by heating the resin to a temperature in the range of from about 175° C. to about 200° C.

4. A method according to claim 2 wherein the moisture content is less than 0.02 wt %.

5. A method according to claim 4 wherein the moisture content is less than 0.01 wt %.

6. A method according to claim 1 wherein the extractable impurities are less than 0.02 wt %.

7. A method according to claim 6 wherein the extractable impurities do not exceed 0.01 wt %.

8. A method according to claim 1 wherein the polymerization temperature is in a range of from about 200° C. to 220° C.

9. A method according to claim 1 wherein the solid phase polymerization is continued for at least 6 hours.

10. A method according to claim 9 wherein the solid phase polymerization is continued for at least 14 hours.

11. A method according to claim 1 wherein the number average molecular weight is increased to at least 40,000 number average molecular weight.

12. A method according to claim 1 wherein the number average molecular weight is increased by the solid phase polymerization to at least 60,000 number average molecular weight.

13. A method according to claim 1 in which the melt viscosity is increased by the solid phase polymerization to at least 600 Pascal.seconds.

14. A method according to claim 13 in which the melt viscosity is increased by the solid phase polymerization to at least 1,000 Pascal.seconds.

15. A method according to claim 1 in which the relative viscosity is increased by the solid phase polymerization to at least 160.

16. A method according to claim 18 in which the relative viscosity is increased by the solid phase polymerization to at least 200.

17. A method according to claim 1 in which gases emanating from the surface of the resin are removed by conducting the solid phase polymerization at pressures less than atmospheric.

18. A method according to claim 7 in which gases emanating form the surface of the resin are removed by pruging them in a moving stream of a dry, non-reactive gas.

19. A nylon 4.6 resin made by the method of claim 1 characterized in that it has a number average molecular weight over about 50,000 and a degradation ratio of no more than 7.

20. A nylon 4.6 molding resin made by the method of claim 1 characterized in that it has a melt viscosity of at least 600 Pascal.seconds and a degradation ratio of no more than 7.

21. A method according to claim 1 wherein the end group unbalance (AEG-CEG) of the resin used in the polymerization is less than 20 micro-equivalents per gram.

22. A method according to claim 21 wherein the end group unbalance (AEG-CEG) of the nylon 4.6 used in the polymerization is less than 15 microequivalents per gram.

23. A method according to claim 1 wherein the end group balance (AEG-CEG) remains substantially constant during the polymerization.

* * * * *